United States Patent
Tseng (10) Patent No.: US 8,127,194 B2
(45) Date of Patent: Feb. 28, 2012

(54) METHOD AND APPARATUS FOR IMPROVING HYBRID AUTOMATIC REPEAT REQUEST OPERATION IN A WIRELESS COMMUNICATIONS SYSTEM

(75) Inventor: Li-Chih Tseng, Taipei (TW)

(73) Assignee: Innovative Sonic Limited, Port Louis (MU)

(*) Notice: Subject to any disclaimer, the term of this patent is extended or adjusted under 35 U.S.C. 154(b) by 932 days.

(21) Appl. No.: 12/136,066

(22) Filed: Jun. 10, 2008

(65) Prior Publication Data

US 2008/0313519 A1 Dec. 18, 2008

Related U.S. Application Data (60) Provisional application No. 60/943,561, filed on Jun. 13, 2007, provisional application No. 60/950,106, filed on Jul. 16, 2007.

(51) Int. Cl.
*H04L 1/18* (2006.01)
*G08C 25/02* (2006.01)
*H04W 4/00* (2009.01)

(52) U.S. Cl. ........................ 714/748; 370/329

(58) Field of Classification Search ............ 714/18, 714/748–751; 370/329
See application file for complete search history.

(56) References Cited

U.S. PATENT DOCUMENTS

| | | | |
|---|---|---|---|
| 6,741,581 B1 | 5/2004 | Sun | |
| 7,969,948 B2 * | 6/2011 | Zhang et al. | 370/335 |
| 2003/0210669 A1 | 11/2003 | Vayanos | |
| 2004/0148552 A1 | 7/2004 | Matsumoto | |
| 2006/0064625 A1 | 3/2006 | Klein | |
| 2006/0293055 A1 | 12/2006 | Pirskanen | |
| 2007/0189248 A1 * | 8/2007 | Chang et al. | 370/338 |

FOREIGN PATENT DOCUMENTS

| | | |
|---|---|---|
| EP | 1 496 639 A2 | 1/2005 |
| EP | 1496639 A2 | 12/2005 |
| EP | 1 496 639 A3 | 7/2007 |
| JP | 2002135233 A | 5/2002 |
| JP | 2003273844 A | 9/2003 |
| JP | 2005525745 A | 8/2005 |
| JP | 2008228310 A | 9/2008 |
| JP | 2008537379 A | 9/2008 |

(Continued)

OTHER PUBLICATIONS

Wang et al., Hybrid ARQ scheme with antenna permutation for MIMO systems in slow fading channels, 2006, Networks, LNCS, p. 1222-1227.*

(Continued)

*Primary Examiner* — Shelly A Chase
(74) *Attorney, Agent, or Firm* — Klein, O'Neill & Singh, LLP (57) ABSTRACT

In order to avoid unknown behavior of a user equipment, the present invention provides a method of improving Hybrid Automatic Repeat Request, known as HARQ, operation for a network in a wireless communications system. The method includes adding a HARQ information information element, abbreviated to IE, and a Multi-Input Multi-Output, known as MIMO, parameters IE into a radio resource control message, wherein the radio resource control message is used by the network to assign, replace or release a physical channel used by the user equipment, and transmitting the radio resource control message to the user equipment.

24 Claims, 6 Drawing Sheets

FOREIGN PATENT DOCUMENTS

| | | |
|---|---|---|
| JP | 2009219111 A | 9/2009 |
| KR | 20020019334 | 3/2002 |
| KR | 1020050091581 A | 9/2005 |
| KR | 1020050109411 A | 11/2005 |
| KR | 1020060016292 A | 2/2006 |
| KR | 1020060025231 A | 3/2006 |
| KR | 1020060031862 A | 4/2006 |
| KR | 100648067 B1 | 11/2006 |
| KR | 1020070024302 A | 3/2007 |
| WO | 2006071831 A2 | 7/2006 |
| WO | 2006071831 A3 | 7/2006 |
| WO | 2006100597 A1 | 9/2006 |
| WO | 2007052719 A1 | 5/2007 |

OTHER PUBLICATIONS

Onggosanusi et al., Hybrid ARQ Transmission and combining for MIMO systems,2003, IEEE, p. 3205-3209.*

R2-072262 3GPP TSG-RAN WG2 Meeting #58, "Introduction two DRX schemes in URA_PCH and CELL_PCH",May 2007.

R2-072305 3GPP TSG-RAN WG2 Meeting #58, "Introduction of HS-DSCH reception in CELL_FACH, URA_PCH and CELL_PCH",May 2007.

R2-071884 3GPP TSG-RAN WG2 Meeting #58, "Restriction on the number of MIMO processes",May 2007.

R2-072258 3GPP TSG-RAN WG2 Meeting #58, "Introduction of Improved L2 support for high data rates and Enhanced CELL_FACH state",May 2007.

Disclosure 960116,ASUSTeK,Mar. 2007.

Dsiclosure 960242,ASUSTeK,May 2007.

Disclosure 960325,ASUSTeK,May 2007.

Disclosure 960357,ASUSTeK,Jun. 2007.

Disclosure 950440,ASUSTeK,Dec. 2006.

R2-081312 3GPP TSG-RAN WG2 Meeting #61, "Correction to MIMO with the message Physical Channel Reconfiguration",Feb. 2008.

3GPP TSG-RAN WG2 Meeting #58, Kobe, Japan, May 7-11, 2007 (R2-072262).

3GPP TSG-RAN WG2 Meeting #58, Kobe, Japan, May 7-11, 2007 (R2-072305).

Office Action on related foreign application (JP2008-153381) from the Japan Patent Office dated Dec. 14, 2010.

3GPP TS 25.331 (Mar. 2007), p. 401-404, 442-444.

Office Action on corresponding foreign application (JP2008-151123) from the Japan Patent Office dated Mar. 1, 2011.

Notice of Allowance on corresponding foreign application (KR Application No. 10-2008-55830) from the Korean Intellectual Property Office dated Sep. 30, 2010.

Office Action on corresponding foreign application (JP2008-151123) from the Japan Patent Office dated Nov. 9, 2010.

Notice of Allowance on corresponding foreign application (KR Application No. 10-2008-55831) from the Korean Intellectual Property Office dated Nov. 29, 2010.

3GPP TS 25.331 V7.4.0, 3GPP, Mar. 2007, P319,320,348,405,406,591,592,638,662.

"Universal Mobile Telecommunications System (UMTS); Radio Resource Control (RRC); Protocol specification (3GPP TS 25.331 version 7.5.0 Release 7)", ETSI TS 125 331 V7.5.0 (Jun. 2007), p. 41, p. 295, p. 371, p. 476-479, p. 684, p. 1199, ISSN: 0000-0001, ETSI Standards, LIS, Sophia Antipolis Cedex, France, XP014040019.

Qualcomm Europe: "Impact of MIMO on RAN2 Specifications" 3GPP TSG-RAN WG2 meeting #56-bis, R2-070194, pp. 1-4, Jan. 15-19, 2007, XP002482050.

Qualcomm Europe: "Proposed CR to TS 25.331 [Rel-7] on introducing MIMO in RRC specification" 3GPP TSG-RAN2 Meeting #56bis, R2-070241, pp. 1-22, Jan. 15-19, 2007, XP002482051.

3GPP TS 25.321 V7.4.0 (Mar. 2007), p. 85-86.

Office Acton on corresponding foreign application (JP2008-163026) from the Japan Patent Office dated Jun. 28. 2011.

Qualcomm Europe, Nokia, Ericsson, Philips, Alcatel-Lucent: "Introduction of DTX-DRX and HS-SCCH less in MAC", 3GPP TSG-RAN WG2 Meeting #56-bis, R2-070346, Jan. 15-19, 2007, XP050133427, Sorrento, Italy.

* cited by examiner

METHOD AND APPARATUS FOR IMPROVING HYBRID AUTOMATIC REPEAT REQUEST OPERATION IN A WIRELESS COMMUNICATIONS SYSTEM

CROSS REFERENCE TO RELATED APPLICATIONS

This application claims the benefit of U.S. Provisional Application No. 60/943,561, filed on Jun. 13, 2007 and entitled "Method and Apparatus for Improving UE Waiting and DRX Operation in a Wireless Communication System" and the benefit of U.S. Provisional Application No. 60/950,106, filed on Jul. 16, 2007 and entitled "Method and Apparatus for Improving HARQ Operations in the Transition of MIMO Mode and non-MIMO Mode and in HS-SCCH Less Operation", the contents of which are incorporated herein by reference.

BACKGROUND OF THE INVENTION

1. Field of the Invention

The present invention relates to a method and related apparatus for improving Hybrid Automatic Repeat Request (HARQ) operation for a network in a wireless communications system, and more particularly, to a method and related apparatus for modifying a radio resource control message for improving HARQ operation.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS (Quality of Service) requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

HSDPA and HSUPA adopt Hybrid Automatic Repeat Request (HARQ) technology to enhance retransmission rate and reduce transmission delay. HARQ is a technology combining Feed-forward Error Correction (FEC) and ARQ methods, which makes a Universal Terrestrial Radio Access Network (UTRAN) trigger retransmission according to positive/negative acknowledgement signals (ACK/NACK) transmitted from a user equipment (UE), and the UE stores useful information about the last failed transmission for later use. Simply, when a previous data is unsuccessfully decoded, the UE shall combine the received data with the previous data and perform a decoding procedure on the combined data, for enhancing the probability of successful decoding. The procedure of combing the received data with the previous data is called HARQ combining.

To further increase the downlink data rate, 3GPP introduces a Multi-Input Multi-Output (MIMO) technology, with which a UE and a base station, known as a Node-B, utilize multiple antennas to transmit/receive radio signals. The MIMO technology can be further integrated with spatial multiplexing, beam forming and spatial diversity technologies to reduce signal interference and increase channel capacity. When the UE is not configured in the MIMO operation, the UE can only receive one transport block on a High Speed Physical Downlink Shared Channel (HS-PDSCH) in each Transmission Time Interval (TTI), and the UE includes 8 HARQ processes at most. On the other hand, when the UE is configured in the MIMO operation, the UE receives two transport blocks on the HS-PDSCH in each TTI, and the number of HARQ processes is restricted to 12, 14 or 16.

To control the HARQ operation and the MIMO operation of the UE, the UTRAN can set configuration of the MIMO operation in radio resource control (RRC) messages with information elements (IEs) in a RRC protocol layer, and send the RRC messages to the UE through corresponding RRC procedures. For the HARQ operation, the UE is configured to the HARQ operation according to an IE "HARQ Info". An IE "Number of Processes" included in the IE "HARQ Info" is used for setting the number of HARQ processes used by the UE. For the MIMO operation, the UE is configured to the MIMO operation by receiving an IE "MIMO parameters" included in the RRC message. The IE "MIMO parameters" includes an IE "MIMO operation", an IE "MIMO N_cqi_typeA/M_cqi ratio" and an IE "MIMO pilot configuration". The IE "MIMO operation" is used to indicate the UE to activate or continue the MIMO operation, and correspondingly includes two parameter values, which represent "start" and "continue", respectively. The IE "MIMO N_cqi_typeA/M_cqi ratio" includes information about the antenna numbers of the UE and the Node-B. The IE "MIMO pilot configuration" includes information about diversity, channelization code, etc. Note that, when the IE "MIMO parameters" is not included in the received RRC message, the UE shall stop the MIMO operation.

On the other hand, when the IE "MIMO parameters" is included in the received RRC message, the UE stores the value of the IE "MIMO N_cqi_typeA/M_cqi ratio" and the value of the IE "MIMO pilot configuration" in a MIMO_PARAMS variable and sets the value of a MIMO_STATUS variable. After specific conditions are all satisfied, the UE sets the MIMO_STATUS variable to TRUE and is configured to the MIMO operation. The specific conditions are as follows:

1. The UE is in a CELL_DCH state.
2. The IE "MIMO N_cqi_typeA/M_cqi ratio" is included in the MIMO_PARAMS variable.
3. The IE "MIMO pilot configuration" is included in the MIMO_PARAMS variable.

Note that, HARQ combining is not permitted during transition between MIMO mode and non-MIMO mode. The UE regards the first transmission after the transition as a new transmission, for avoiding incorrect HARQ combining. As mentioned previously, the number of HARQ processes in MIMO mode is restricted to 12, 14 or 16. If the UE does not change HARQ configuration accordingly when the UE performs the mode transition of the MIMO operation, the number of HARQ processes may be incorrect. It means that the IE "HARQ Info" has to be carried in the RRC message which triggers the mode transition of the MIMO operation. In other words, the IE "HARQ Info" and the IE "MIMO parameters" should be both included in the same RRC message. For example, the IE "HARQ Info" and the IE "MIMO parameters" are both included in a CELL UPDATE CONFIRM message. When the UE receives the CELL UPDATE CONFIRM message, the UE can perform the mode transition of MIMO operation and change HARQ configuration according to the CELL UPDATE CONFIRM message so that the number of HARQ processes is changed to the correct number.

In many RRC messages that the UTRAN sends to the UE, a PHYSICAL CHANNEL RECONFIGURATION message is used by the UTRAN to assign, replace or release a physical channel used by the UE. The PHYSICAL CHANNEL RECONFIGURATION message comprises the IE "MIMO parameters" but does not comprise the IE "HARQ Info". In other words, even if the UE can trigger the mode transition of MIMO operation according to the PHYSICAL CHANNEL RECONFIGURATION message, the UE cannot be configured to the MIMO operation because the number of HARQ processes is not changed according to the PHYSICAL CHANNEL RECONFIGURATION message. As a result, the UE may receive an incorrect number of HARQ processes, and unknown behavior occurs.

SUMMARY OF THE INVENTION

The present invention provides a method and related apparatus for improving MIMO operation for a UE in a wireless communications system.

The present invention discloses a method of improving Hybrid Automatic Repeat Request, known as HARQ, operation for a network in a wireless communications system, the method comprising adding a HARQ information information element, abbreviated to IE, and a Multi-Input Multi-Output, known as MIMO, parameters IE into a radio resource control message, wherein the radio resource control message is used by the network to assign, replace or release a physical channel used by a user equipment, and transmitting the radio resource control message to the user equipment.

The present invention further discloses a communications device used in a wireless communications system for improving Hybrid Automatic Repeat Request, known as HARQ, operation, the communications device comprising a control circuit for realizing functions of the communications device, a central processing unit installed in the control circuit for executing a program code to operate the control circuit, and a memory coupled to the central processing unit for storing the program code. The program code comprises adding a HARQ information information element, abbreviated to IE, and a Multi-Input Multi-Output, known as MIMO, parameters IE into a radio resource control message, wherein the radio resource control message is used by the communications device to assign, replace or release a physical channel used by a user equipment, and transmitting the radio resource control message to the user equipment.

The present invention further discloses a method of improving Hybrid Automatic Repeat Request, known as HARQ, operation for a user equipment, abbreviated to UE, in a wireless communications system, the method comprising receiving a radio resource control message, and controlling the radio resource control message to be unallowed to change the status of a Multi-Input Multi-Output, known as MIMO, operation of the UE, wherein the radio resource control message is used by a network of the wireless communications system to assign, replace or release a physical channel used by the UE.

The present invention further discloses a communications device used in a wireless communications system for improving Hybrid Automatic Repeat Request, known as HARQ, operation, the communications device comprising a control circuit for realizing functions of the communications device, a central processing unit installed in the control circuit for executing a program code to operate the control circuit, and a memory coupled to the central processing unit for storing the program code. The program code comprises receiving a radio resource control message, and controlling the radio resource control message to be unable to change the status of a Multi-Input Multi-Output, known as MIMO, operation of the communications device, wherein the radio resource control message is used by a network of the wireless communications system to assign, replace or release a physical channel used by the communications device.

The present invention further discloses a method of improving Hybrid Automatic Repeat Request, known as HARQ, operation for a user equipment, abbreviated to UE, in a wireless communications system, the method comprising entering a Multi-Input Multi-Output, known as MIMO, mode when the UE satisfies a plurality of conditions and receives a number of HARQ processes information element, abbreviated to IE, set to an even number, and adjusting the number of HARQ processes to meet the requirement of a non-MIMO mode when the UE transfers from the MIMO mode to the non-MIMO mode.

The present invention further discloses a communications device used in a wireless communications system for improving Hybrid Automatic Repeat Request, known as HARQ, operation, the communications device comprising a control circuit for realizing functions of the communications device, a central processing unit installed in the control circuit for executing a program code to operate the control circuit, and a memory coupled to the central processing unit for storing the program code. The program code comprises entering a Multi-Input Multi-Output, known as MIMO, mode when the communications device satisfies a plurality of conditions and receives a number of HARQ processes information element, abbreviated to IE, set to an even number, and adjusting the number of HARQ processes to meet the requirement of a non-MIMO mode when the communications device transfers from the MIMO mode to the non-MIMO mode.

These and other objectives of the present invention will no doubt become obvious to those of ordinary skill in the art after reading the following detailed description of the preferred embodiment that is illustrated in the various figures and drawings.

DETAILED DESCRIPTION

Figure 6:
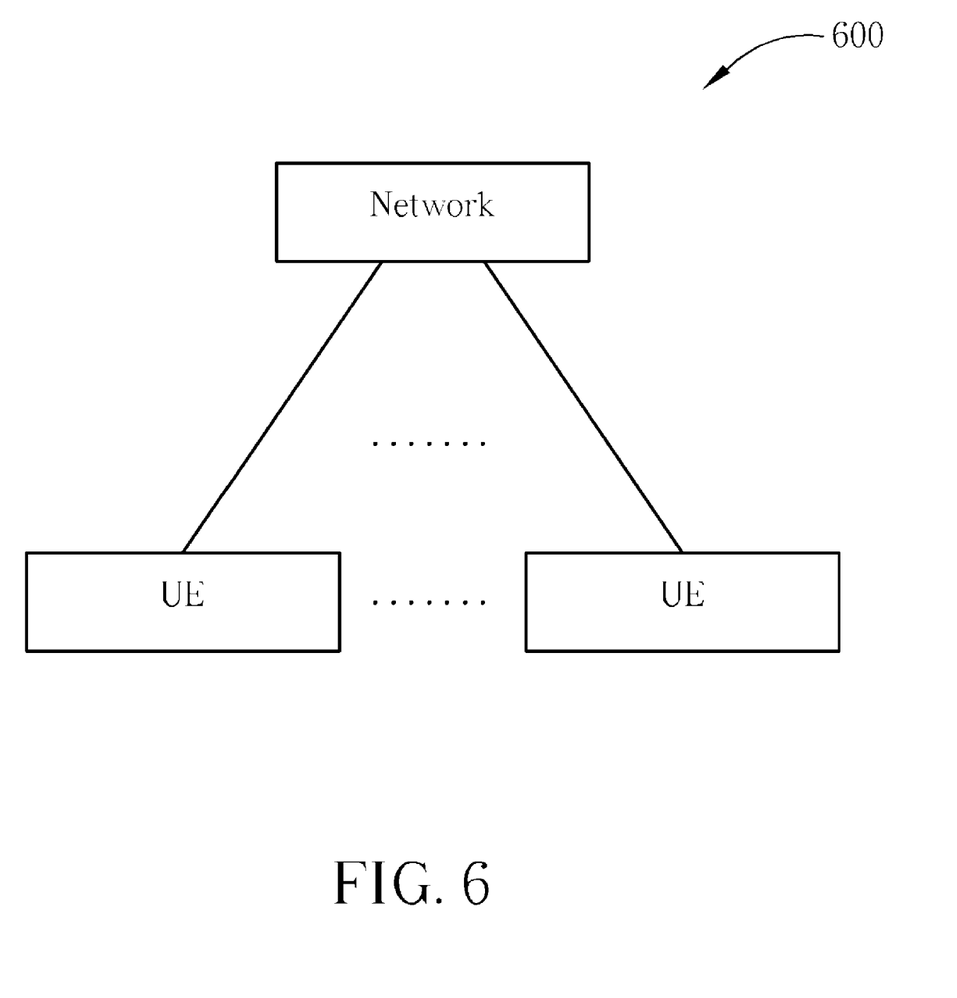
FIG. 6 is a schematic diagram of a communications system.

Please refer to FIG. 6, which is a schematic diagram of a wireless communications system 600. The wireless communications system 600 is preferably a High Speed Package Access (HSPA) system, and is briefly composed of a network and a plurality of user equipments (UEs). In FIG. 6, the network and the UEs are simply utilized for illustrating the structure of the wireless communications system 600. Practically, the network may comprise a plurality of base stations (or Node B), radio network controllers and so on according to actual demands, and the UEs can be devices such as mobile phones, computer systems, etc.

Figure 1:
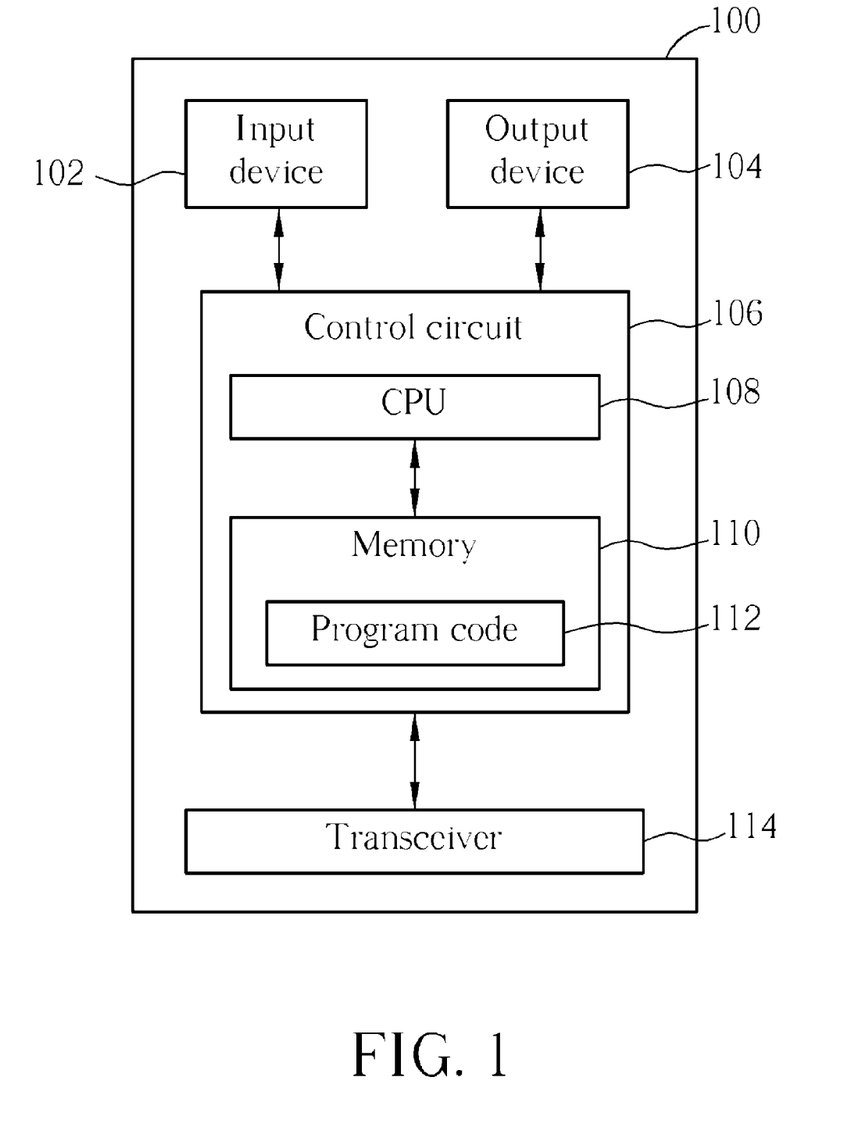
FIG. 1 is a functional block diagram of a communications device.

Please refer to FIG. 1, which is a functional block diagram of a communications device 100. The communications device 100 can be used for implementing the network and the UE shown in FIG. 6. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
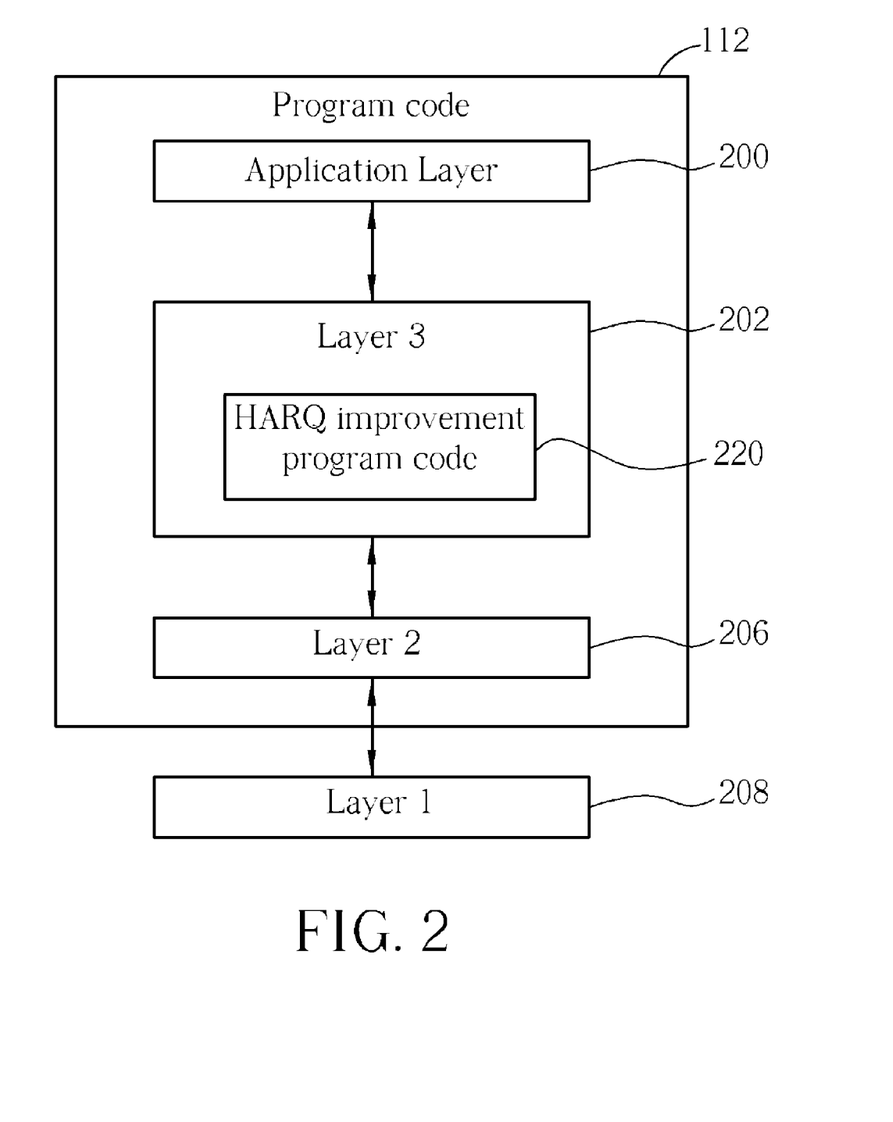
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 208. The Layer 3 202 is for performing radio resource control (RRC). The Layer 2 206 is for performing link control, and the Layer 1 208 is a physical layer.

As mentioned previously, a PHYSICAL CHANNEL RECONFIGURATION message comprises the IE "MIMO parameters" but does not comprise the IE "HARQ Info". Even if the UE receives the PHYSICAL CHANNEL RECONFIGURATION message and triggers the mode transition of the MIMO operation according to the IE "MIMO parameters" in the PHYSICAL CHANNEL RECONFIGURATION message, the UE may not be configured to the MIMO operation because the UE cannot change the number of HARQ processes according to the IE "HARQ Info". As a result, the UE may receive incorrect number of HARQ processes and unknown behavior occurs.

Figure 3:
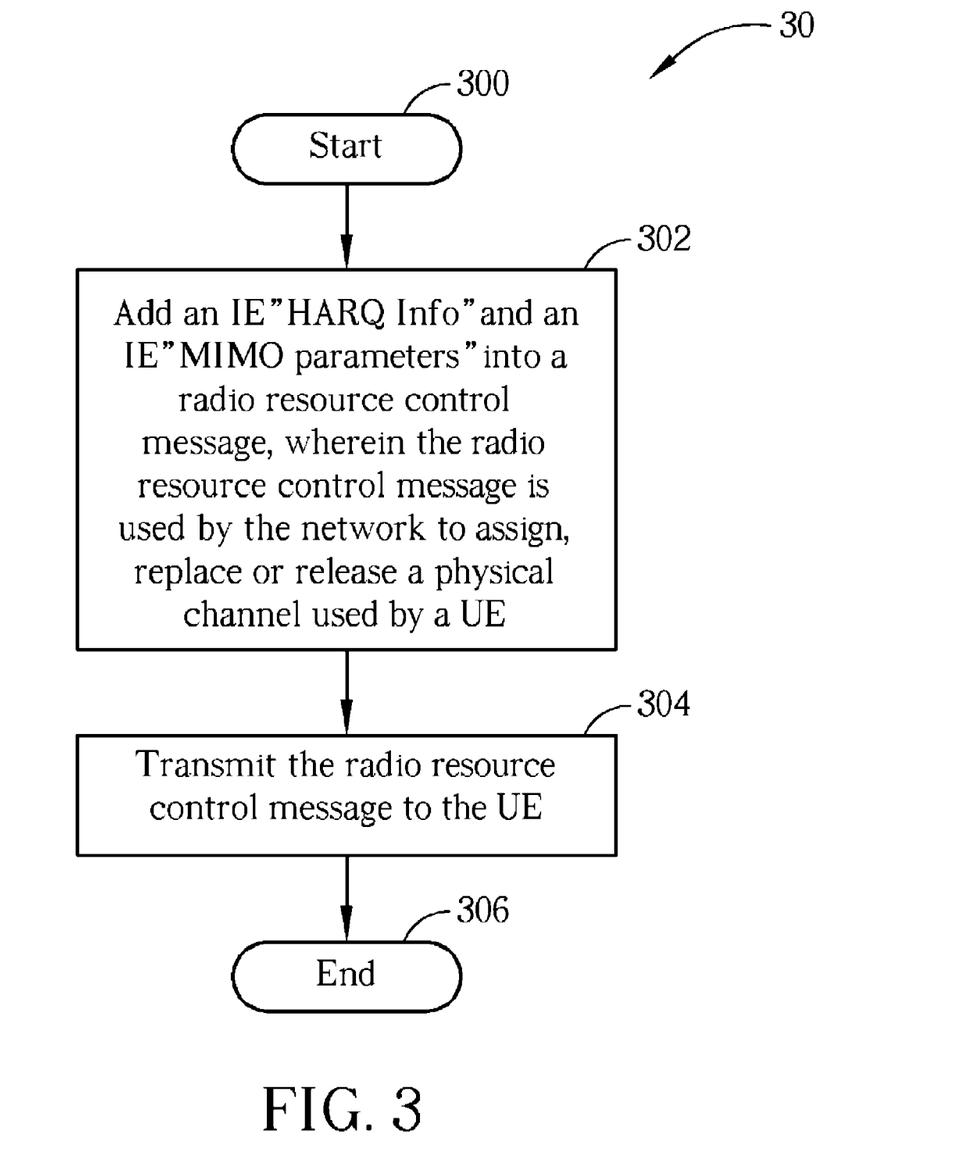
FIG. 3 to FIG. 5 are flowcharts of processes according to embodiments of the present invention.

In this situation, the embodiment of the present invention provides a HARQ improvement program code 220 for the program code 112 in the Layer 3 202, for improving the HARQ operation. Please refer to FIG. 3, which is a flowchart of a process 30 according to an embodiment of the present invention. The process 30 is utilized for improving HARQ operation for a network in the wireless communications system 600. The process 30 can be compiled into the HARQ improvement program code 220. The process 30 includes the following steps:

Step 300: Start.

Step 302: Add an IE "HARQ Info" and an IE "MIMO parameters" into a radio resource control message, wherein the radio resource control message is used by the network to assign, replace or release a physical channel used by a UE.

Step 304: Transmit the radio resource control message to the UE.

Step 306: End.

In the process 30, the radio resource control message is the PHYSICAL CHANNEL RECONFIGURATION message, which is used by the network to assign, replace or release a physical channel used by a UE. The IE "HARQ Info" is utilized for changing the number of HARQ processes and corresponding soft buffers. The IE "MIMO parameters" is utilized for starting or stopping a MIMO operation. According to the process 30, the network not only adds the IE "MIMO parameters" but also adds the IE "HARQ Info" into the PHYSICAL CHANNEL RECONFIGURATION message, and transmits the PHYSICAL CHANNEL RECONFIGURATION message to the UE. Therefore, the UE performs the mode transition of the MIMO operation according to the IE "MIMO parameters" in the PHYSICAL CHANNEL RECONFIGURATION message. On the other hand, when the UE performs the mode transition of the MIMO operation, the UE changes the number of HARQ processes to 1 to 8 HARQ processes for the requirement of non-MIMO mode according to the IE "HARQ Info" in the PHYSICAL CHANNEL RECONFIGURATION message, or changes the number of HARQ processes to 12, 14 or 16 HARQ processes for the requirement of MIMO mode.

The UE cannot change the number of HARQ processes according to the prior art PHYSICAL CHANNEL RECONFIGURATION message which comprises the IE "MIMO parameters" but does not comprise the IE "HARQ Info". As a result, the UE may receive incorrect number of HARQ processes and unknown behavior occurs. Compared with the prior art, the embodiment of the present invention adds the IE "HARQ Info" to the PHYSICAL CHANNEL RECONFIGURATION message, and thereby the UE performs the mode transition of the MIMO operation properly according to the PHYSICAL CHANNEL RECONFIGURATION message. Moreover, the number of HARQ processes is changed to a correct number for the requirement of MIMO mode or non-MIMO mode.

Figure 4:
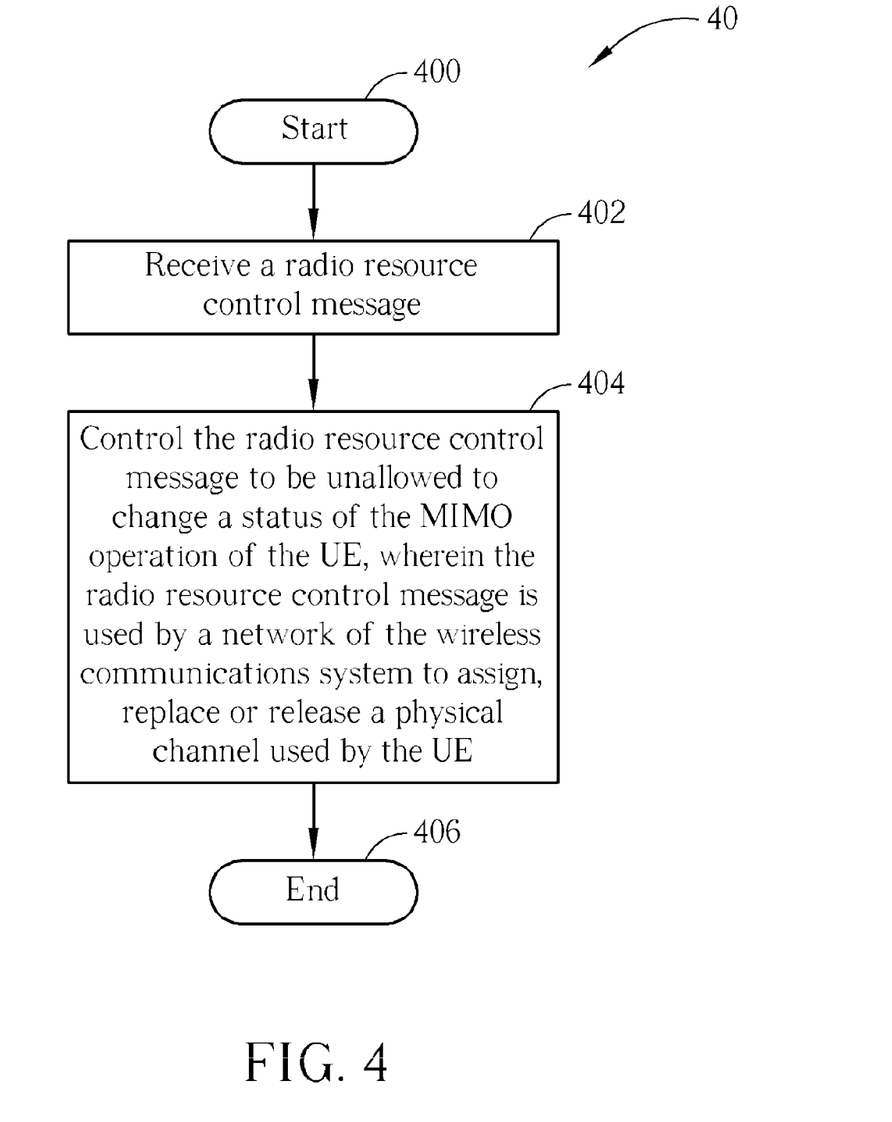

In addition, please refer to FIG. 4, which is a flowchart of a process 40 according to an embodiment of the present invention. The process 40 is utilized for improving HARQ operation for a UE in the wireless communications system 600. The process 40 can be compiled into the HARQ improvement program code 220. The process 40 includes the following steps:

Step 400: Start.

Step 402: Receive a radio resource control message.

Step 404: Control the radio resource control message to be unallowed to change a status of the MIMO operation of the UE, wherein the radio resource control message is used by a network of the wireless communications system to assign, replace or release a physical channel used by the UE.

Step 406: End.

In the process 40, the radio resource control message is the PHYSICAL CHANNEL RECONFIGURATION message, which is described previously. According to the process 40, after receiving the PHYSICAL CHANNEL RECONFIGURATION message, the UE controls the PHYSICAL CHANNEL RECONFIGURATION message to be unallowed to change the status of the MIMO operation, that is, the UE is not allowed to trigger the mode transition of the MIMO operation. Furthermore, the UE controls the PHYSICAL CHANNEL RECONFIGURATION message to be allowed to affect only the stored variables related to MIMO operation in the UE. In other words, the UE does not change the status of the MIMO operation anymore and only affects the stored variables related to the MIMO operation according to the PHYSICAL CHANNEL RECONFIGURATION message including the IE "MIMO parameters".

The prior art PHYSICAL CHANNEL RECONFIGURATION message comprises the IE "MIMO parameters" but does not comprise the IE "HARQ Info". The IE "MIMO parameters" is utilized for starting or stopping a MIMO operation and the UE shall stop the MIMO operation when the IE "MIMO parameters" is not included in the received radio resource control message. When the number of HARQ processes is not changed accordingly when the UE performs the mode transition of MIMO operation, unknown behavior may occur. Compared with the prior art, the embodiment of the present invention controls the PHYSICAL CHANNEL RECONFIGURATION message to be unallowed to change the status of the MIMO operation, and thereby the unknown behavior is avoided.

From the above, the process 30 changes the IEs in the PHYSICAL CHANNEL RECONFIGURATION message in the network and the process 40 changes the effect of the PHYSICAL CHANNEL RECONFIGURATION message in the UE, so that the embodiments of the present invention can avoid unknown behavior from incorrect number of HARQ processes.

Figure 5:
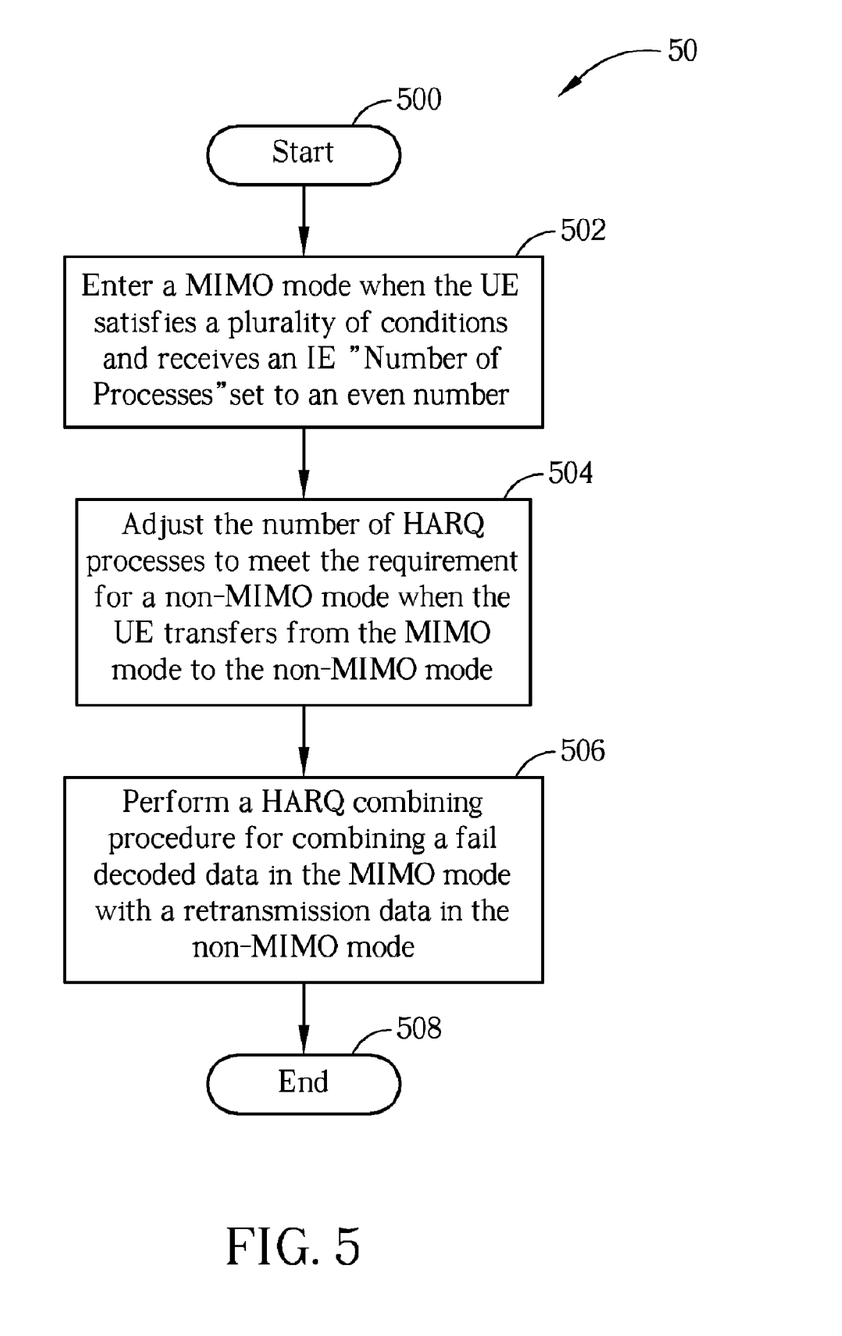

On the other hand, when the related configurations of the MIMO operation and the HARQ operation are transmitted to the UE by different radio resource control messages respectively, the UE should take into consideration configurations of the MIMO operation and the HARQ operation at the same time for avoiding unknown behavior. Please refer to FIG. 5, which is a flowchart of a process 50 according to an embodiment of the present invention. The process 50 is utilized for improving HARQ operation for a UE in the wireless communications system 600. The process 50 can be compiled into the HARQ improvement program code 220. The process 50 includes the following steps:

Step 500: Start.

Step 502: Enter a MIMO mode when the UE satisfies a plurality of conditions and receives an IE "Number of Processes" set to an even number.

Step 504: Adjust the number of HARQ processes to meet the requirement for a non-MIMO mode when the UE transfers from the MIMO mode to the non-MIMO mode.

Step 506: Perform a HARQ combining procedure for combining a fail decoded data in the MIMO mode with a retransmission data in the non-MIMO mode.

Step 508: End.

In the prior art, the UE sets the MIMO_STATUS variable to TRUE and is configured to the MIMO operation after specific conditions are all satisfied. The specific conditions are as follows:

1. The UE is in a CELL_DCH state.
2. The IE "MIMO N_cqi_typeA/M_cqi ratio" is included in the MIMO_PARAMS variable.
3. The IE "MIMO pilot configuration" is included in the MIMO_PARAMS variable.

In the process 50, the UE does not only have to satisfy the conditions as above but confirms that the received IE "Number of Processes" is set to an even number, for entering the MIMO mode. That is, the UE sets the MIMO_STATUS variable to TRUE only when the UE satisfies the conditions and the received IE "Number of Processes" is set to an even number. Therefore, the number of HARQ processes is correct for MIMO mode and is used to receive two transport blocks on HS-PDSCH in each TTI, so that the transmission efficiency of the MIMO operation is enhanced.

Moreover, the UE adjusts the number of HARQ processes to meet the requirement of the non-MIMO mode when transferring from the MIMO mode to the non-MIMO mode. The number of HARQ processes is restricted to 1 to 8 at most. For example, the UE uses 12 HARQ processes in the MIMO mode and automatically releases a half of HARQ processes to meet the requirement of the non-MIMO mode when transferring to the non-MIMO mode. That is, the UE then uses 6 HARQ processes in the non-MIMO mode. Or, the UE automatically releases a predefined number of HARQ processes to meet the requirement of the non-MIMO mode. Therefore, the UE changes the number of HARQ processes without IE "HARQ Info". Moreover, the UE performs a HARQ combining procedure according to the correct number of HARQ processes for combining the fail decoded data in the MIMO mode with the retransmission data in the non-MIMO mode for enhancing the probability of successful decoding.

In the prior art, the HARQ combining procedure is not permitted due to incorrect HARQ combining occurring during the mode transition of the MIMO operation. The UE can only change the number of HARQ processes according to the IE "HARQ Info". Compared with the prior art, according to the process 50, the UE enters the MIMO mode after confirming that the number of HARQ processes is an even number. Therefore, the number of HARQ processes can be used to receive two transport blocks on HS-PDSCH in each TTI so that the transmission efficiency of the MIMO operation is enhanced. In addition, the UE automatically adjusts the number of HARQ processes without the IE "HARQ Info" to meet the requirement of MIMO mode during the mode transition of the MIMO operation, and thereby the UE performs the HARQ combining procedure according to the correct number of HARQ processes, for enhancing the probability of successful decoding.

In conclusion, the embodiment of the present invention changes the IEs included in the PHYSICAL CHANNEL RECONFIGURATION message for avoiding unknown behavior from incorrect number of HARQ processes received when the mode transition of the MIMO operation. On the other hand, the embodiment of the present invention changes the criteria for entering the MIMO mode. Therefore, the transmission efficiency of the HARQ operation and the MIMO operation is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving Hybrid Automatic Repeat Request, known as HARQ, operation for a network in a wireless communications system, the method comprising:
    adding a HARQ information information element, abbreviated to IE, and a Multi-Input Multi-Output, known as MIMO, parameters IE into a radio resource control message, wherein the radio resource control message is used by the network to assign, replace or release a physical channel used by a user equipment; and
    transmitting the radio resource control message to the user equipment.

2. The method of claim 1, wherein the radio resource control message is a PHYSICAL CHANNEL RECONFIGURATION message.

3. The method of claim 1, wherein the HARQ information IE is utilized for changing the number of HARQ processes and corresponding soft buffers, and the MIMO parameters IE is utilized for starting or stopping a MIMO operation.

4. The method of claim 1, wherein the radio resource control message received by the user equipment comprises the HARQ information IE for changing the number of HARQ processes and corresponding soft buffers and the MIMO parameters IE for starting or stopping a MIMO operation.

5. A communications device used in a wireless communications system for improving Hybrid Automatic Repeat Request, known as HARQ, operation, the communications device comprising:
    a control circuit for realizing functions of the communications device;
    a central processing unit installed in the control circuit for executing a program code to operate the control circuit; and
    a memory coupled to the central processing unit for storing the program code;
    wherein the program code comprises:
        adding a HARQ information information element, abbreviated to IE, and a Multi-Input Multi-Output, known as MIMO, parameters IE into a radio resource control message, wherein the radio resource control message is used by the communications device to assign, replace or release a physical channel used by a user equipment; and
        transmitting the radio resource control message to the user equipment.

6. The communications device of claim 5, wherein the radio resource control message is a PHYSICAL CHANNEL RECONFIGURATION message.

7. The communications device of claim 5, wherein the HARQ information IE is utilized for changing the number of HARQ processes and corresponding soft buffers, and the MIMO parameters IE is utilized for starting or stopping a MIMO operation.

8. The communications device of claim 5, wherein the radio resource control message received by the user equipment comprises the HARQ information IE for changing the number of HARQ processes and corresponding soft buffers and the MIMO parameters IE for starting or stopping a MIMO operation.

9. A method of improving Hybrid Automatic Repeat Request, known as HARQ, operation for a user equipment, abbreviated to UE, in a wireless communications system, the method comprising:
    receiving a radio resource control message; and
    controlling the radio resource control message to be unallowed to change the status of a Multi-Input Multi-Output, known as MIMO, operation of the UE, wherein the radio resource control message is used by a network of the wireless communications system to assign, replace or release a physical channel used by the UE.

10. The method of claim 9, wherein the radio resource control message is a PHYSICAL CHANNEL RECONFIGURATION message.

11. The method of claim 9, wherein controlling the radio resource control message to be unallowed to change the status of the MIMO operation of the UE comprises controlling the radio resource control message to be allowed to only affect the stored variables about the MIMO operation in the UE.

12. A communications device used in a wireless communications system for improving Hybrid Automatic Repeat Request, known as HARQ, operation, the communications device comprising:
    a control circuit for realizing functions of the communications device;
    a central processing unit installed in the control circuit for executing a program code to operate the control circuit; and
    a memory coupled to the central processing unit for storing the program code;
    wherein the program code comprises:
        receiving a radio resource control message; and
        controlling the radio resource control message to be unable to change the status of a Multi-Input Multi-Output, known as MIMO, operation of the communications device, wherein the radio resource control message is used by a network of the wireless communications system to assign, replace or release a physical channel used by the communications device.

13. The communications device of claim 12, wherein the radio resource control message is a PHYSICAL CHANNEL RECONFIGURATION message.

14. The communications device of claim 12, wherein controlling the radio resource control message to be unallowed to change the status of the MIMO operation of the communications device comprises controlling the radio resource control message to be allowed to only affect the stored variables about MIMO operation in the communications device.

15. A method of improving Hybrid Automatic Repeat Request, known as HARQ, operation for a user equipment, abbreviated to UE, in a wireless communications system, the method comprising:
    entering a Multi-Input Multi-Output, known as MIMO, mode when the UE satisfies a plurality of conditions and receives a number of HARQ processes information element, abbreviated to IE, set to an even number; and
    adjusting the number of HARQ processes to meet the requirement of a non-MIMO mode when the UE transfers from the MIMO mode to the non-MIMO mode.

16. The method of claim 15, wherein the plurality of conditions comprise:
    the UE is in a CELL_DCH state;
    a MIMO N_cqi_typeA/M_cqi ratio IE is included in a MIMO_PARAMS variable; and
    a MIMO pilot configuration IE is included in the MIMO_PARAMS variable.

17. The method of claim 15, wherein entering the MIMO mode is setting a MIMO_STATUS variable to TRUE.

18. The method of claim 15, wherein adjusting the number of HARQ processes to meet the requirement for the non-MIMO mode comprises automatically releasing a half of HARQ processes to meet the requirement of the non-MIMO mode.

19. The method of claim 15 further comprising performing a HARQ combining procedure for combining a fail decoded data in the MIMO mode with a retransmission data in the non-MIMO mode.

20. A communications device used in a wireless communications system for improving Hybrid Automatic Repeat Request, known as HARQ, operation, the communications device comprising:
    a control circuit for realizing functions of the communications device;
    a central processing unit installed in the control circuit for executing a program code to operate the control circuit; and
    a memory coupled to the central processing unit for storing the program code;
    wherein the program code comprises:
        entering a Multi-Input Multi-Output, known as MIMO, mode when the communications device satisfies a plurality of conditions and receives a number of HARQ processes information element, abbreviated to IE, set to an even number; and
        adjusting the number of HARQ processes to meet the requirement of a non-MIMO mode when the communications device transfers from the MIMO mode to the non-MIMO mode.

21. The communications device of claim 20, wherein the plurality of conditions comprise:
    the communications device is in a CELL_DCH state;
    a MIMO N_cqi_typeA/M_cqi ratio IE is included in a MIMO_PARAMS variable; and
    a MIMO pilot configuration IE is included in the MIMO_PARAMS variable.

22. The communications device of claim 20, wherein entering the MIMO mode is setting a MIMO_STATUS variable to TRUE.

23. The communications device of claim 20, wherein adjusting the number of HARQ processes to meet the requirement of the non-MIMO mode comprises automatically releasing a half of HARQ processes to meet the requirement of the non-MIMO mode.

24. The communications device of claim 20 further comprising performing a HARQ combining procedure for combining a fail decoded data in the MIMO mode with a retransmission data in the non-MIMO mode.

* * * * *